(12) United States Patent
Torikoshi et al.

(10) Patent No.: US 6,586,848 B2
(45) Date of Patent: Jul. 1, 2003

(54) FUNCTION SELECTING CONTROL SYSTEM

(75) Inventors: Akihiko Torikoshi, Shizuoka (JP);
Kazuhiro Kubota, Shizuoka (JP);
Yuichi Nakazawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/973,737

(22) Filed: Oct. 11, 2001

(65) Prior Publication Data
US 2002/0045953 A1 Apr. 18, 2002

(30) Foreign Application Priority Data
Oct. 13, 2000 (JP) .................................... 2000-313738

(51) Int. Cl.[7] ................................................ B60L 1/00
(52) U.S. Cl. .................. 307/9.1; 307/10.1; 307/112; 340/286.01; 340/825.31; 318/443; 318/250.12; 701/49
(58) Field of Search ................................ 307/9.1, 10.1, 307/112, 116; 340/286.01, 825.31, 825.34, 438, 439; 318/443, 444, 250.12, 282–283; 701/36, 49; 180/314

(56) References Cited

U.S. PATENT DOCUMENTS

| | | | |
|---|---|---|---|
| 3,973,242 A | 8/1976 | Field et al. ............. 340/168 B |
| 4,052,701 A | 10/1977 | Leuschner .................. 340/171 |
| 4,345,145 A | 8/1982 | Norwood ..................... 219/492 |
| 4,887,262 A | * 12/1989 | van Veldhuizen ........... 370/449 |
| 5,285,138 A | * 2/1994 | Okada ........................ 318/280 |
| 5,553,144 A | 9/1996 | Almquist et al. ............. 380/25 |
| 5,726,547 A | * 3/1998 | Reime ........................ 318/483 |
| 6,400,110 B1 | * 6/2002 | Yabe et al. ................. 318/443 |

* cited by examiner

Primary Examiner—Brian Sircus
Assistant Examiner—Calixto Rodriguez
(74) Attorney, Agent, or Firm—Armstrong, Westerman & Hattori, LLP

(57) ABSTRACT

A function selecting control system is provided, which modularizes a plurality of wiper control systems, builds them in an integrated circuit, and selects a desired system on the basis of a selection signal of the system from the outside, thereby drive-controlling a wiper motor. The function selecting control system includes: input device 30a for inputting a selection signal which selects a control logic block 30h corresponding to a starting control mode out of the control logic blocks provided for every control mode of the motor; judgment device 30c for reading the input selection signal for a standard number of times and for judging the coincidence among the read selection signals; count device 30e for counting the number of times of the coincidence; settlement device 30f for settling the selection signal when the number of times of the coincidence reaches the predetermined standard number; and system starting device 30g for starting a control logic corresponding to the settled selection signal.

7 Claims, 10 Drawing Sheets

FUNCTION SELECTING CONTROL SYSTEM

BACKGROUND OF THE INVENTION (1) Field of the Invention

The present invention relates to a function selecting control system, and more specifically, relates to a function selecting control system, which modularizes a plurality of controlling functions, for example, of a wiper control system, builds them in an integrated circuit, and selects a controlling function to be started on the basis of a selection signal from the outside, thereby drive-controlling a wiper motor.

(2) Description of the Related Art

So far, there have been wiper motors driving wipers of a vehicle such as a single-speed wiper motor, a two-speed wiper motor in which a winding of the motor is selected so as to change over the speed in two steps, a wiper motor in which a duty ratio of the field current to be applied into the motor is controlled so as to change the speed of the wipers, and a wiper motor which separately controls rear window wipers and front window wipers.

So far, in order to mount a wiper motor having different specification on a vehicle corresponding to respective kinds of vehicle, a motor controlling device corresponding to each wiper motor to be mounted has been selected so as to drive-control the motor.

As for a conventional motor controlling device, a hardware constitution in the vicinity of the motor to which a battery supplies the electricity has been common to some extent for a variety of wiper motors except for a part of the motor control logic by the software. Therefore, it has been very uneconomical to provide a controlling device, which mounts a custom integrated circuit (IC) that writes a control logic corresponding to only a single kind of wiper motor, causing a problem that the cost of the controlling device rises.

SUMMARY OF THE INVENTION

It is therefore an objective of the present invention to solve the above problem and to provide a function selecting control system, which can adapt to a plurality kinds of wiper motor or a plurality kinds of equipment to be controlled.

In order to attain the above objective, as shown in the basic constitution in FIG. 1, the present invention is to provide a function selecting control system comprising:

a control logic block 30h for storing various control functions of equipment to be controlled after rendering said various control functions logical;

input means 30a for inputting a selection signal which selects a control function corresponding to a control matter from the control logic block 30h;

judgment means 30c for reading the input selection signal for a standard number of times and for judging the coincidence among the read selection signals;

count means 30e for counting the number of times of the coincidence;

settlement means 30f for settling the selection signal when the number of times of the coincidence reaches the predetermined standard number; and system starting means 30g for starting a control function corresponding to the settled selection signal, wherein the control function corresponding to the control matter is selected from the control logic block 30h on the basis of the selection signal from the outside, thereby the system is started.

Preferably, the input means 30a inputs the selection signal in synchronization with a standard clock signal of the system and the selection signal is settled when the input selection signals consecutively coincide with each other.

Preferably, the settlement means 30f outputs a reset-release signal for releasing a reset state of each control function after settling the selection signal so as to release the prohibition of the starting of the control function selected by the selection signal.

Preferably, the settlement means 30f keeps the settled selection signal being impossible to be updated until a shut-off of a power supply of the system after settling the selection signal.

Preferably, the function selecting control system further comprises register means for registering in advance the selection signals which are effective in responding to the system, wherein the selection signal is settled when the input means inputs the registered selection signal for a standard number of times, and a control function corresponding to the selection signal is started.

Preferably, the judgment means updates the selection signal when the input signal coincides with the selection signal registered in the register means and compares the updated selection signal with the selection signal to be input next.

Preferably, each control logic block comprises comparison means for judging a coincidence between the input selection signal and a mode signal corresponding to the selection signal assigned to the control logic block, wherein the control function is started upon judgment of the coincidence.

DESCRIPTION OF THE PREFERRED EMBODIMENTS

In the following, the preferred embodiments of the present invention will be explained with reference to the attached drawings.

Figure 1:
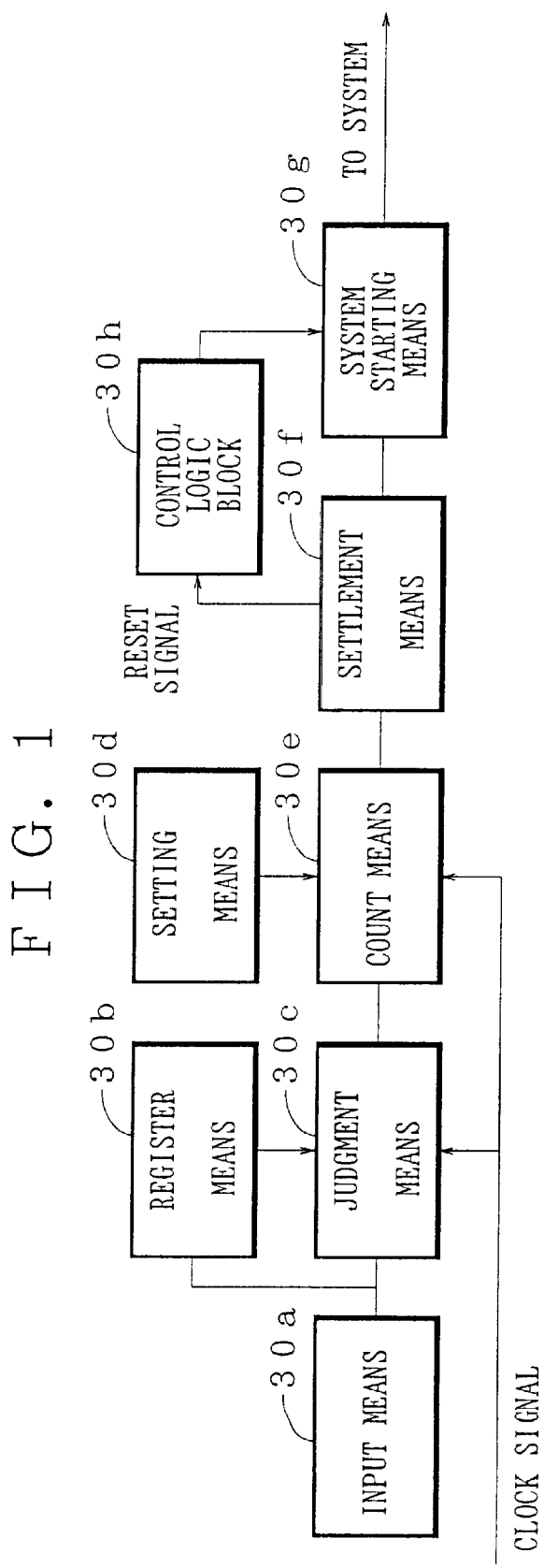
FIG. 1 illustrates a basic constitution of the function selecting control system according to the present invention.
Figure 2:
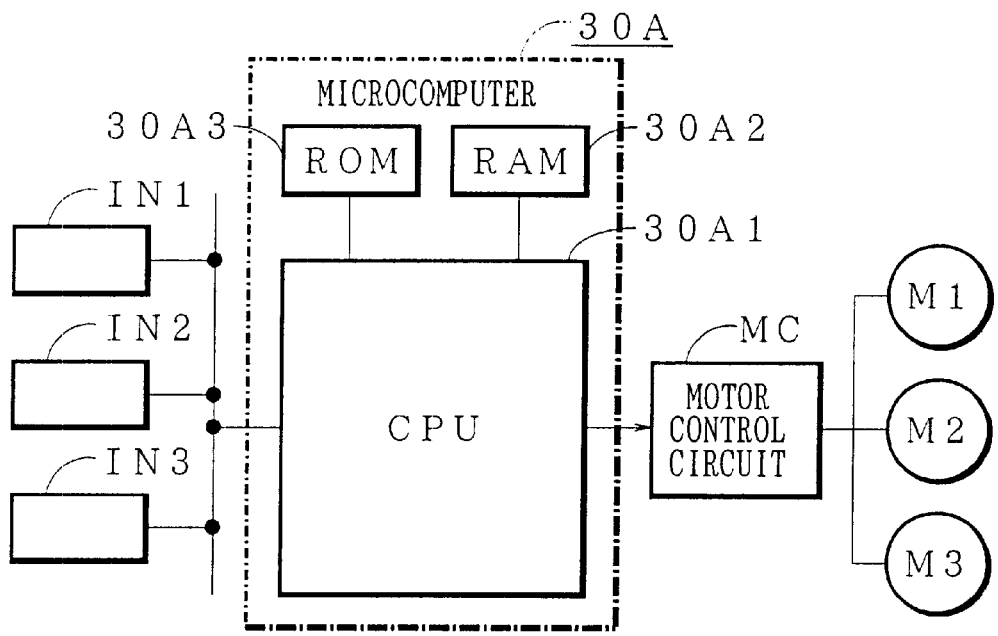
FIG. 2 illustrates an electric constitution of the function selecting control system according to the present invention.

FIG. 2 illustrates an electric constitution of the wiper control system (to be controlled) according to a preferred embodiment of the present invention.

In FIG. 2, a microcomputer 30A includes CPU30A1, which carries out a control-computing of a motor, RAM30A2, which tentatively writes data input from the outside and control-computed results, the control logic corresponding to the wiper motor and wash motor to be controlled, and ROM30A3, which stores various processing data that are needed for the control.

Various input devices IN1–IN3 are connected to an input port of the CPU30A1 through a common bus while a motor control circuit MC, which controls wiper motors M1 and M2 and a wash motor M3 on the basis of control signals output as a result of the control-computing by the CPU30A1, is connected to an output port of the CPU30A1.

As the control logic corresponding to each motor is the control logic corresponding to each wiper control system shown in FIGS. 5, 6, 7, 9, 10 and 11.

Figure 5:
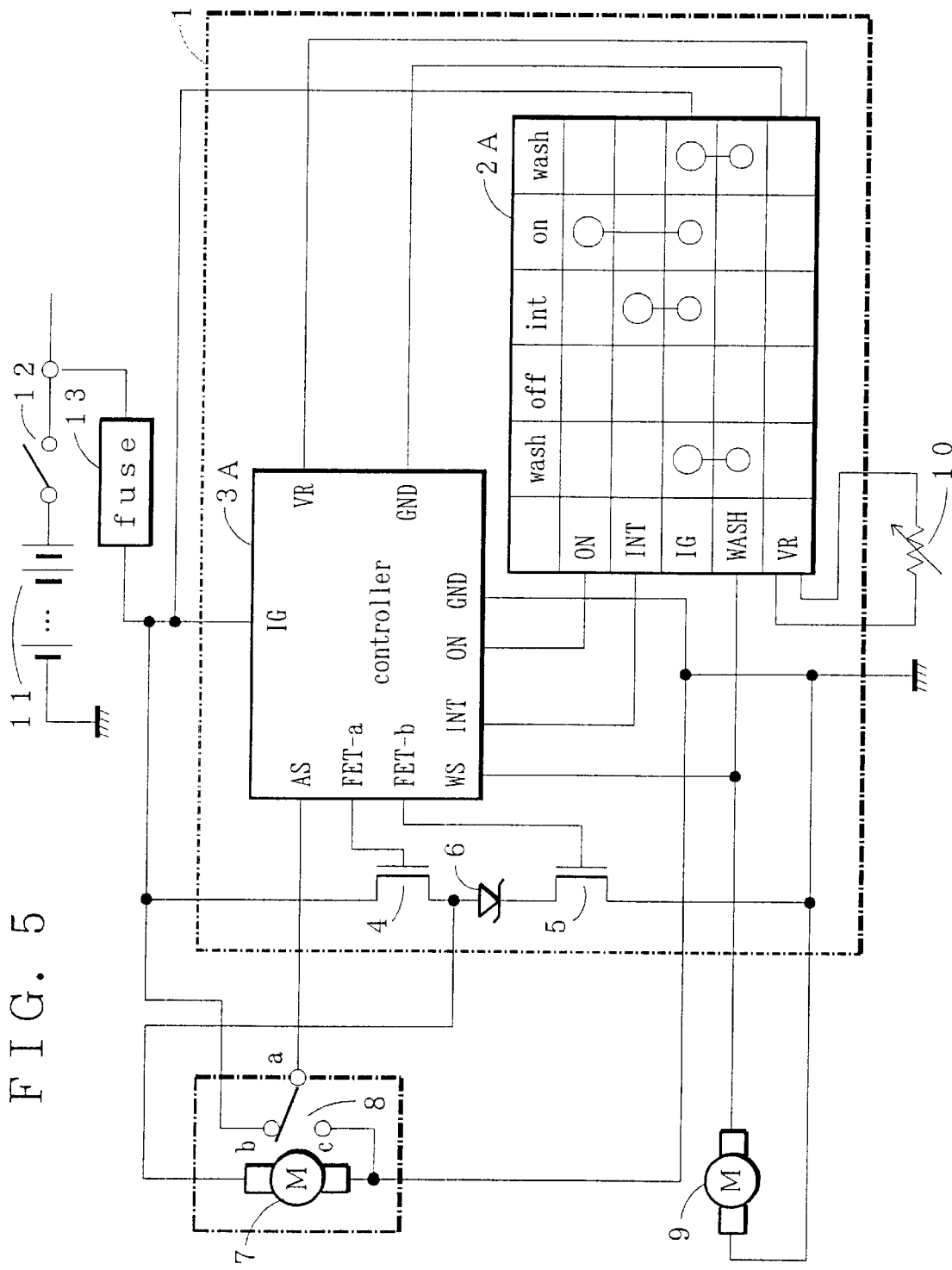
FIG. 5 illustrates an example of the control system applied in the present invention.

FIG. 5 shows high-side switch-type wiper control system, in which a MOS-FET4 for driving the wiper motor is provided with an overheat-blocking protection circuit (not shown in the figure) and arranged in upstream of the wiper motor 7, thereby enabling a protection from the failure such as a short circuit of a wire.

Figure 6:
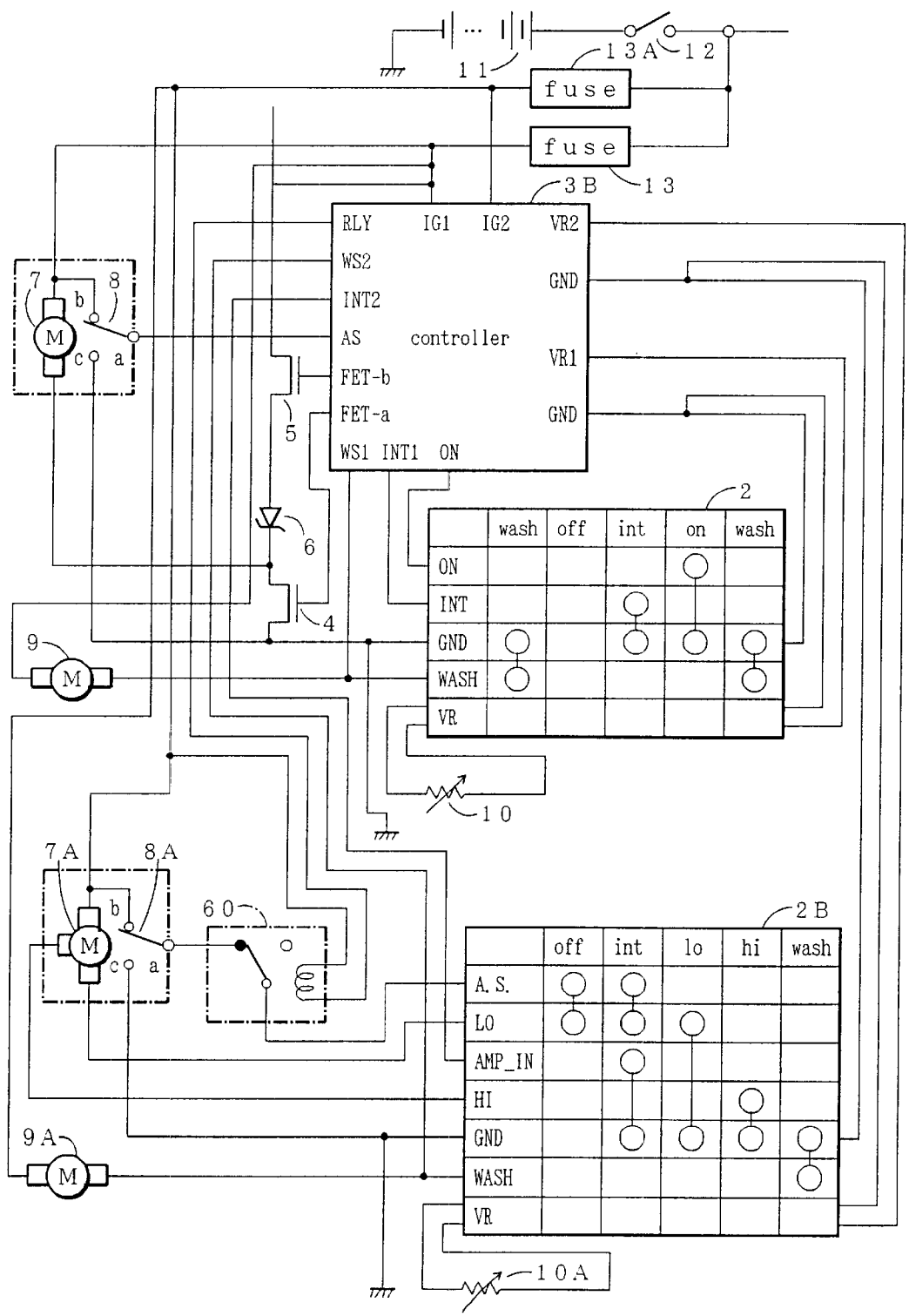
FIG. 6 illustrates an example of the control system applied in the present invention.

FIG. 6 shows a wiper control system for controlling wipers of two systems mounted on a vehicle comprising: a control section consisting of a combination switch 2, controller 3, MOS-FET4 and MOS-FET5, and a Zener diode 6; a wiper drive section consisting of wiper motor 7, AS switch 8 and washer motor 9; and a known relay-type wiper drive section consisting of a combination switch 2B (including variable resistor 10A), two speed-type wiper motor 7A, AS switch 8A, washer motor 9A and relay 60.

Figure 7:
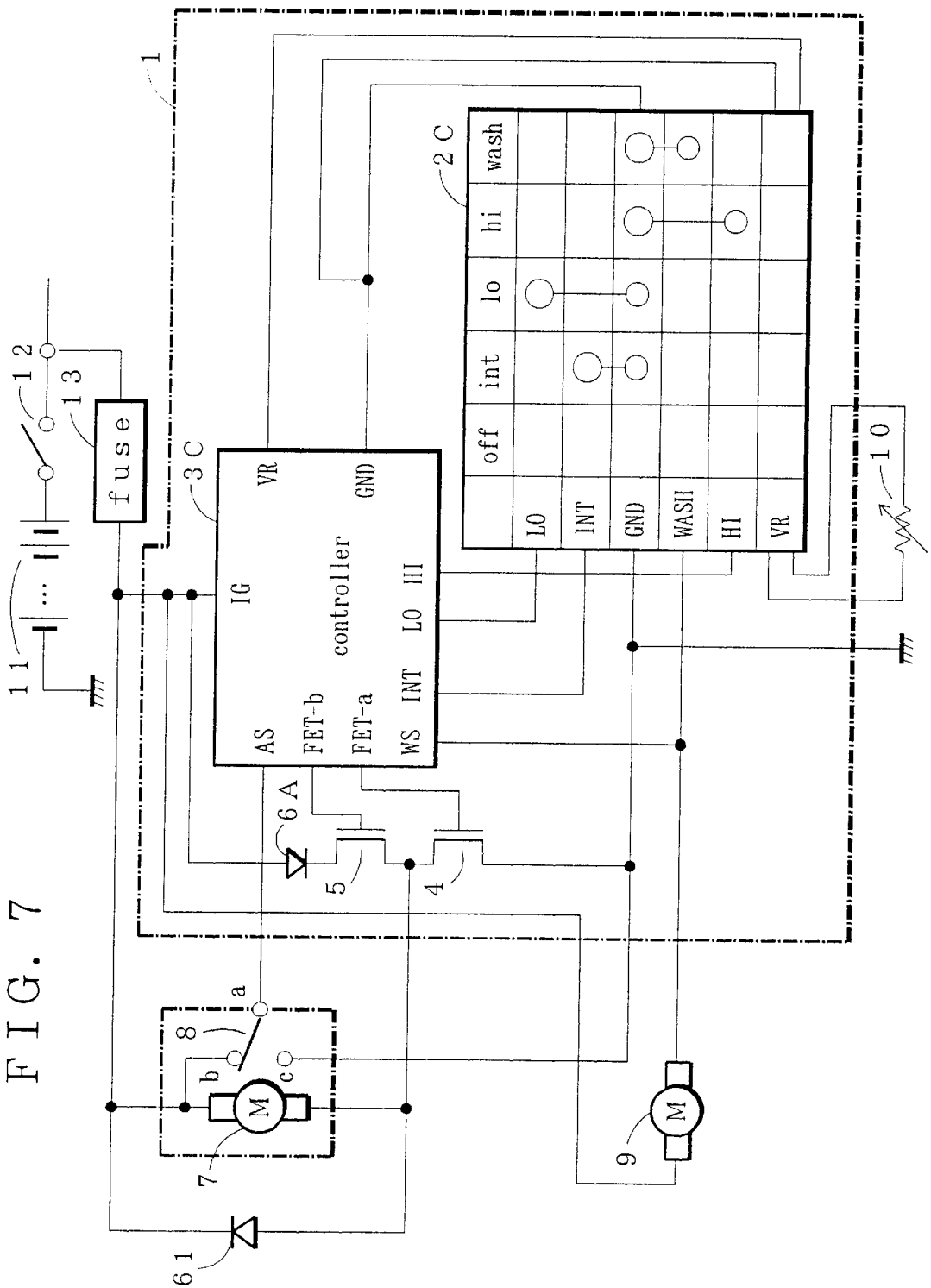
FIG. 7 illustrates an example of the control system applied in the present invention.
Figure 8:
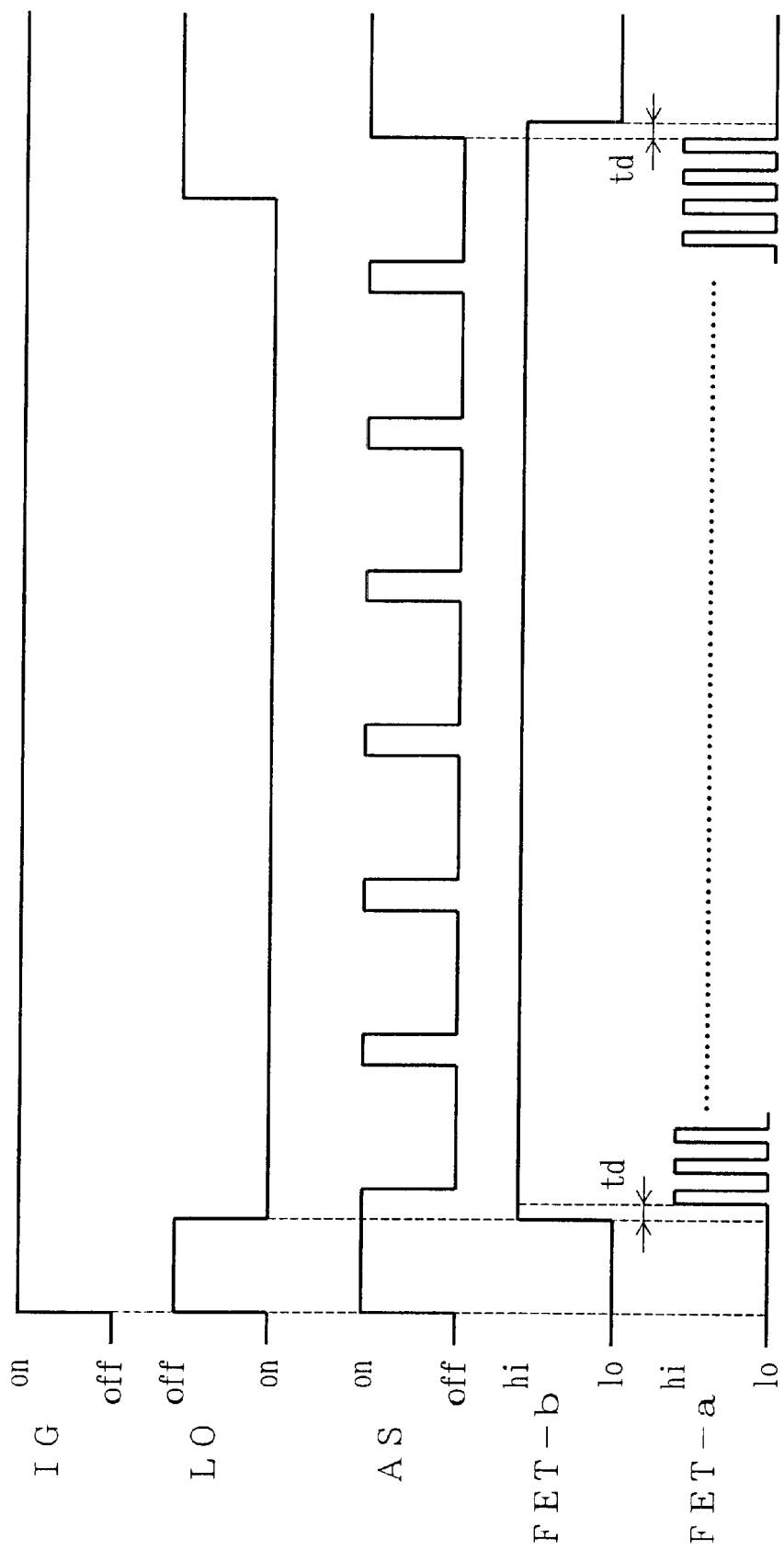
FIG. 8 is a timing chart illustrating the operation of the control system shown in FIG. 7.

FIG. 7 shows a wiper control system for variably driving a single speed wiper motor, in which a controller 3C outputs a control signal of a control output FET-a with the chopper control so as to reduce the revolving speed of the wiper motor 7 as shown in a timing figure in FIG. 8. Upon high-speed operation, the duty ratio of the control signal from the control output FET-a is changed so as to enable a speed adjustable or continuous adjustable operation with three or more levels.

In addition, the chopper frequency is adjusted so as to avoid the resonance frequency, which is different depending upon the kind of the vehicle, thereby controlling the noise caused by the chopper control. When wipers stay on a windshield glass upon switching on an IG switch 12, the wipers are returned to the parking position thereof in a high-speed mode, thereby quickly securing a visibility of the driver.

Figure 9:
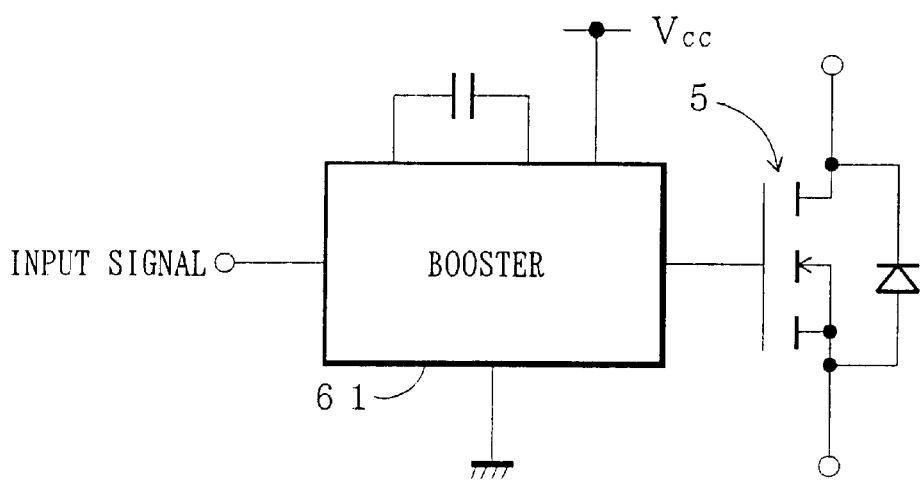
FIG. 9 illustrates an example of the control system applied in the present invention.

As shown in FIG. 9, pressurization means such as a bootstrap circuit or charge pump circuit may be added to a gate of a MOS-FET5 for a wiper motor brake, thereby softening the control logic of the wiper motor control system utilizing a N channel-type MOS-FET5 instead of a P channel-type.

Figure 10:
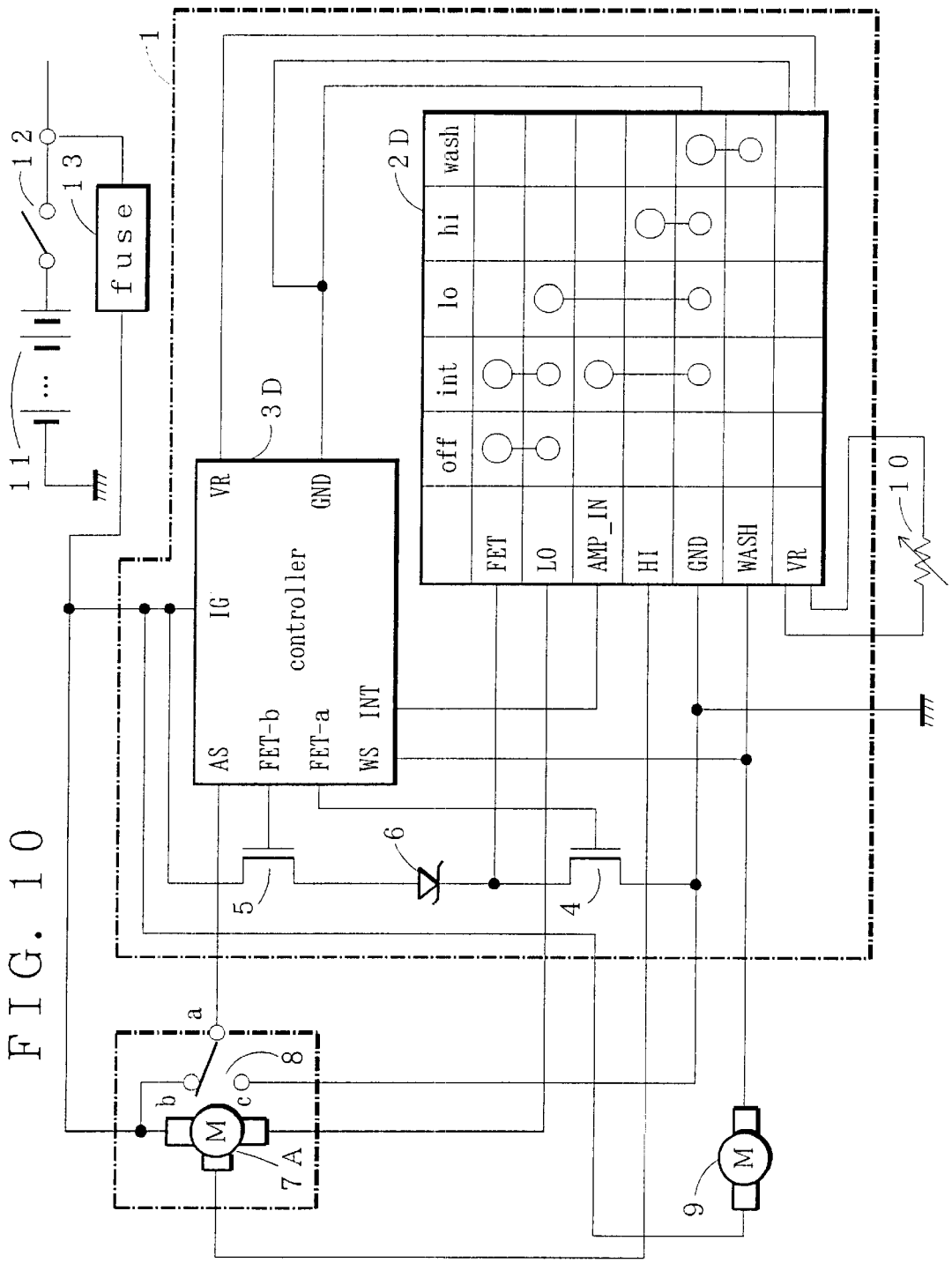
FIG. 10 illustrates an example of the control system applied in the present invention.

FIG. 10 shows a control system for driving a two-speed wiper motor consisting of a combination switch 2D, controller 3D, MOS-FET4 and 5, Zener diode 6, two-speed wiper motor 7A, washer motor 9 and variable resistor 10.

Figure 11:
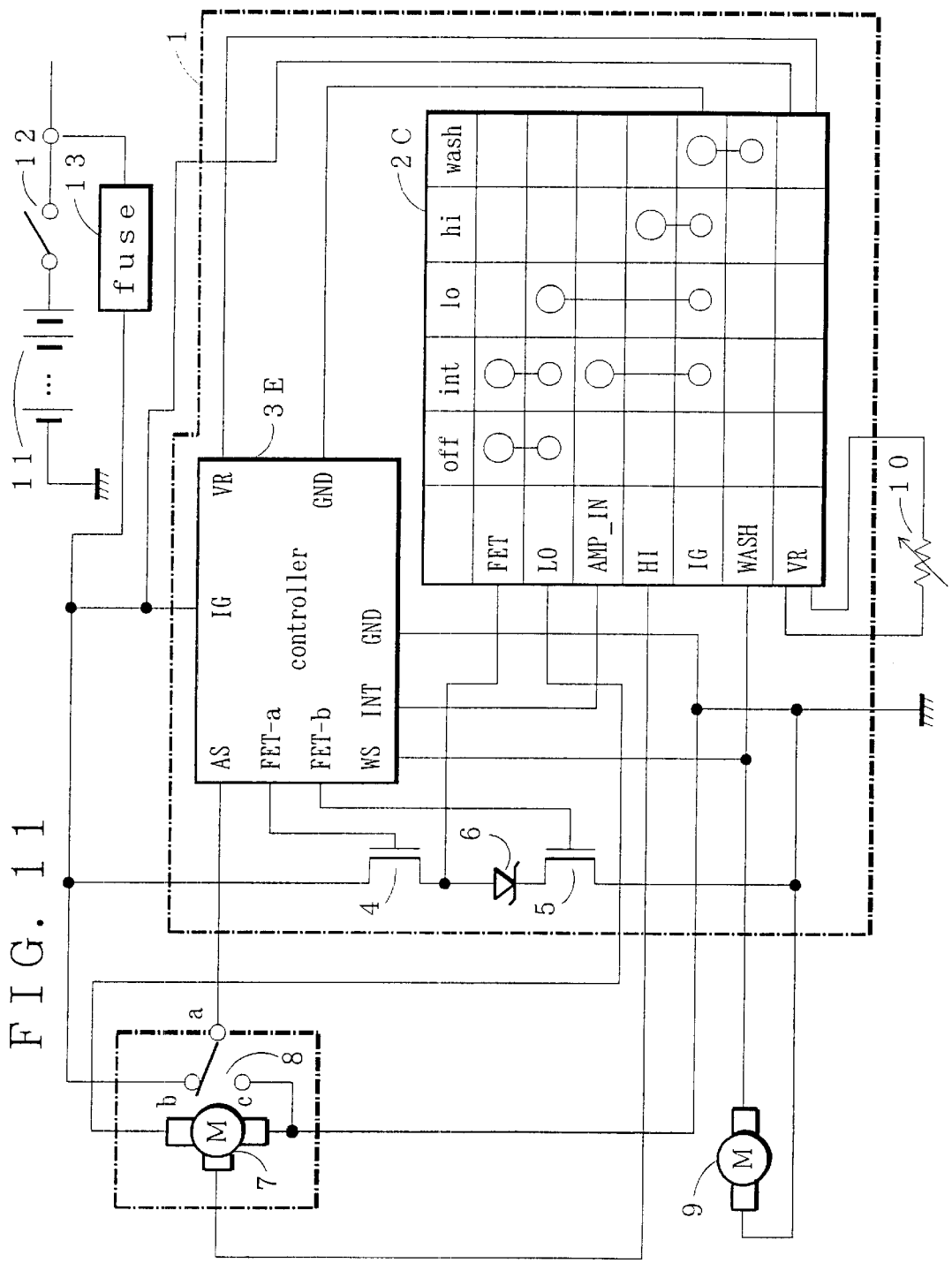
FIG. 11 illustrates an example of the control system applied in the present invention.

FIG. 11 shows a high-side switch-type wiper control system for driving a two-speed wiper motor, which operates and has an effect similarly to the low-side switch-type wiper control system shown in FIG. 10.

In the wiper control systems having different control mode as described above, the CPU30A1 reads out a control program corresponding to a mode selection signal (SEL signal) input from an input device IN3 constituting the mode selector circuit, out of control programs (control logic) for each control mode, which are stored in the ROM30A3. The CPU30A1 processes the input signal input from the input devices IN1 or IN2, such as a combination switch and AS switch, on the basis of the read-out control program, generates the control signal, and outputs the control signal to the MOS-FET4 and MOS-FET5 constituting the motor control circuit MC. As a result, the wiper motors M1 and M2 and the wash motor M3 are drive-controlled by the ON/OFF action of the MOS-FET4 and MOS-FET5.

In the following, the processing of the CPU will be explained with reference to a flow chart shown in FIG. 3.

Upon the start of the system, the CPU30A1 is started, flags in various flag area provided in a work area of the PAM30A2 and discrete variables are reset, and an internal memories for registering the selection signal (SEL signal) are reset, thereby an initialization is carried out (step S1).

After the completion of the initialization, it is judged whether or not a SEL signal specifying the control mode is read in from the input device (mode selector circuit) IN3. If judged not read in, the SEL signal is waited for. If judged read in, it is judged whether or not the SEL signal is previously read in and registered (step S5).

Since the SEL signal is not registered upon the start of the system, the read-in SEL signal is stored in the internal memory of the CPU30A1 as a SEL signal n, then returning to step S3. At step S3, the read-in of the SEL signal is judged. If judged the SEL signal previously being registered at step S5, "1" is added to the read-in number of the SEL signal. This SEL signal reads in the output signal of the mode selector circuit in synchronization with a clock signal of the CPU30A1.

The read-in SEL signal n+1 is compared with the SEL signal n previously registered, then it is judged whether or not both signals coincide with each other (step S11). If judged not coincident, the processing returns to step 1 and newly reads in the SEL signal.

On the other hand, if judged coincident, the SEL signal is updated by replacing the SEL signal n+1 with the SEL signal n (steps S13 and S7).

After the update, whether or not the read-in number of the SEL signal reaches 5 is judged (step S15).

Since the CPU30A1 operates in a different control mode when the SEL signal is different, the CPU30A1 reads out the SEL signal in synchronization with five clock signals (5CKL), and if all the SEL signals read-out five times are the same, it is confirmed that there is no change in the condition of the SEL signal.

If the read-in number of the SEL signal does not reach 5, the processing returns to step 3, then the SEL signal is newly read in and the coincidence judging process is carried out. If the number of the coincidence between the previous updated SEL signal n and the read-in SEL signal n+1 reaches 5 (step S15), the settled SEL signal is transformed to a mode selection signal and a control program is read out from the address of the ROM30A3 corresponding to the mode selection signal (step S17).

When the SEL signal is settled, the processing outputs a signal (reset-releasing signal) for releasing the reset signal, which resets the execution of the control program by the software until the SEL signal is settled, to a program executing section (step S19).

After the output of the reset-releasing signal, before a new SEL signal is read in, whether or not the power supply of the system is OFF is judged, and if OFF, the processing returns to step S1 and prepares to read in next SEL signal (step S21). On the other hand, if not OFF (the system being ON), the processing returns to step S17 keeping the mode selection signal based on the SEL signal already settled. This is to prevent the control function from being changed over during the system being ON and to have a fail-safe function for carrying out to change over the control function after the system-ON is finished by the cutoff of the power supply.

When the execution of the control program is permitted, the CPU30A1 inputs a control signal from the input devices IN1 and IN2 and generates a wiper control signal by processing the control signal in accordance with the control program and outputs the wiper control signal to the MOS-FET4 and MOS-FET5, which constitute the motor control circuit MC. Then, the wiper motors M1 and M2 and the wash motor M3 carry out a continuous wiper action or an intermittent wiper action by the ON/OFF action of the MOS-FET4 and MOS-FET5.

Figure 4:
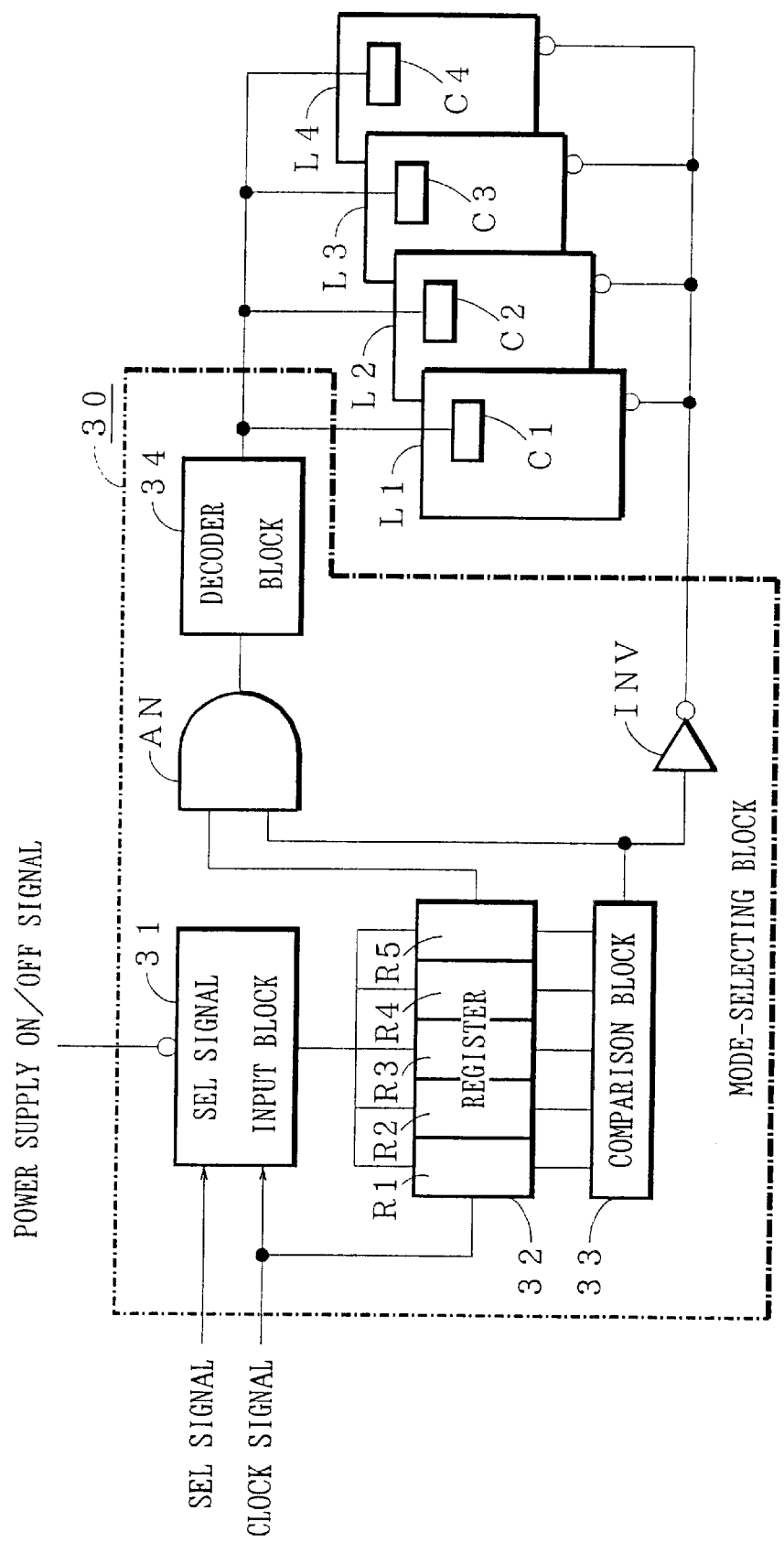
FIG. 4 is a flow chart illustrating an operation of the function selecting control system according to the present invention viewed from the hardware aspect.

As described above, the selection processing of the control program based on the SEL signal is explained in terms of software. FIG. 4 explains the processing in terms of hardware.

That is, in a mode-selecting block 30, the SEL signal is input to the SEL signal input block 31 in synchronization with the clock signal and successively registered in each storing section R of a register 31. When the selection signal is registered into all the storing sections R1–R5, a comparison block 33 carries out the coincidence judgment for each selection signal. If all coincident, a H-level signal is sent to one of input terminals of an AND gate AN while a finally registered SEL signal, which is input to another input terminal, is sent to a decoder block 34 through the AND gate AN.

The SEL signal input block 31 inputs a power supply ON/OFF signal from a power supply device (not shown in the figure) of the system and inputs the SEL signal when the power supply ON/OFF signal is L, that is, when the power supply is OFF, on the other hand, prohibits the input of the SEL signal when the power supply ON/OFF signal is H, that is, when the power supply is ON, thereby keeping the mode selecting signal based on the already settled SEL signal. This is to prevent the control function from being changed over during the system being ON and to permit the change over of the control function after the system-ON is finished.

The decoder block 34 transforms the SEL signal to a mode signal specifying the logic block and sent it to comparison sections C1–C4 of each logic L1–L4. The comparison sections C1–C4 compare thus transformed mode signal with a mode signal assigned to the comparison section, and if the two mode signals coincide with each other, the comparison section recognizes the computing by itself. When the SEL signal is settled, the H-level signal output from the comparison block 33 is reversed to the L-level in an inverter INV and input to a negative logic input terminal of the logic blocks L1–L4 as the reset-releasing signal, thereby enabling the processing.

As described above, when the SEL signal is registered in all the registers, the comparison block 33 carries out the coincidence judgment of each SEL signal. Instead, if a control mode to be started is set up in advance, a part of the register may register the SEL signal corresponding to the pertinent control mode and the SEL signal may be settled when the SEL signal input from the outside in synchronization with the clock signal continuously coincides with the registered SEL signal for a predetermined number of times (for example, five times).

Figure 3:
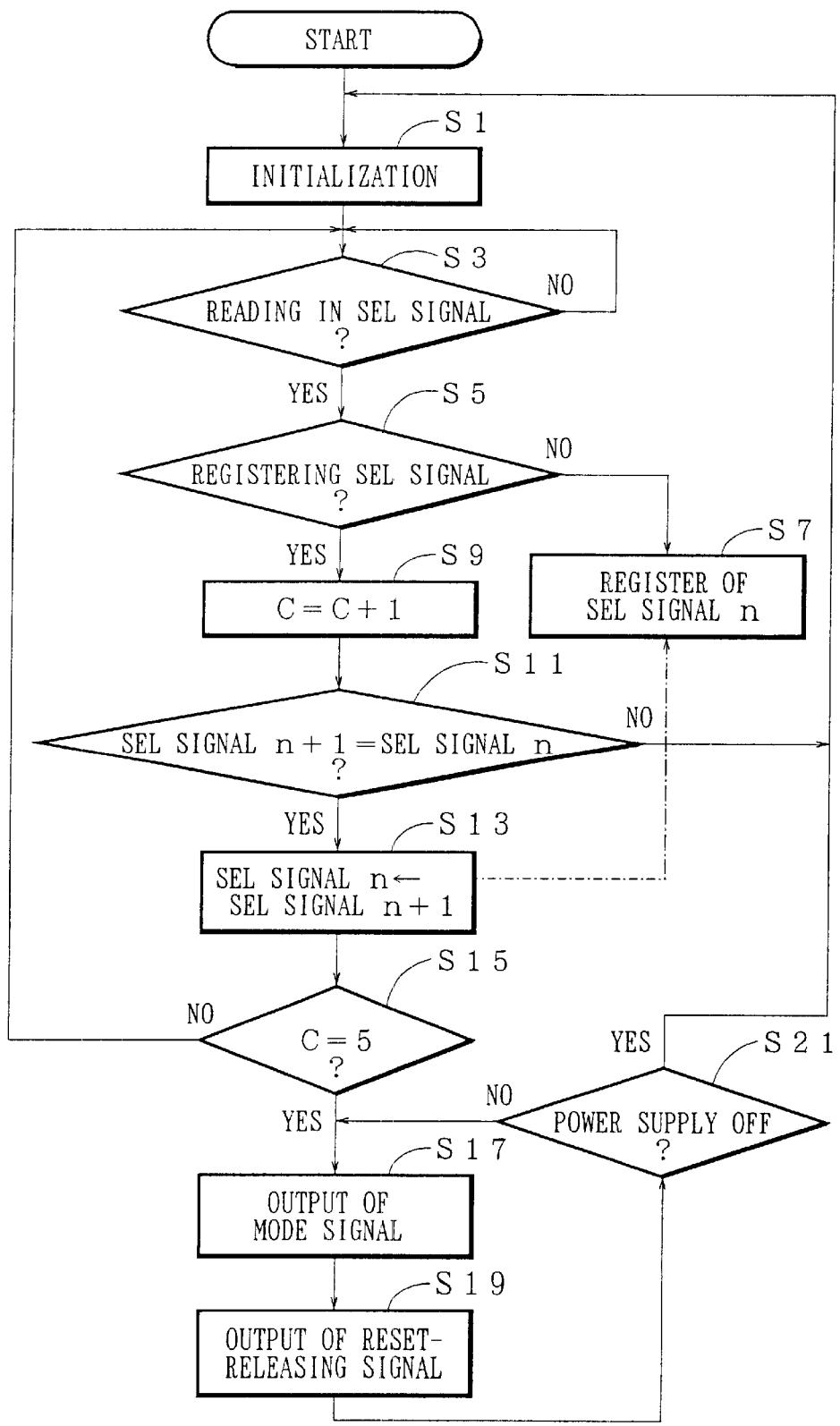
FIG. 3 is a flow chart illustrating an operation of the function selecting control system according to the present invention.

As explained with a flow chart shown in FIG. 3, the SEL signal may be updated when the registered SEL signal coincides with a SEL signal to be input next and thus updated SEL signal may be compared with a SEL signal to be input next.

In the preferred embodiments described above, a wiper motor of a vehicle is explained as an example of the equipment to be controlled. However, needless to say, the equipment to be controlled is not limited to a wiper motor of a vehicle.

The aforementioned preferred embodiments are described to aid in understanding the present invention and variations may be made by one skilled in the art without departing from the spirit and scope of the present invention.

As for the present invention, the function selecting control system comprises: input means for inputting a selection signal which selects a control logic block corresponding to a starting control mode out of the control logic blocks provided for every control mode of the motor; judgment means for reading the input selection signal for a standard number of times and for judging the coincidence among the read selection signals; count means for counting the number of times of the coincidence; settlement means for settling the selection signal when the number of times of the coincidence reaches the predetermined standard number; and system starting means for starting a control logic corresponding to the settled selection signal.

Since the control logic corresponding to the pertinent motor control mode upon the construction of the system is selected in advance from the control logic corresponding to a plurality kinds of the motor control mode on the basis of the selection signal from the outside so as to start the system, therefore the control logic corresponding to each motor control mode can be easily changed over, resulting in that the construction of the system corresponding to the pertinent motor control mode becomes easy.

As for the present invention, the input means inputs the selection signal in synchronization with a standard clock signal of the system and the selection signal is settled when the input selection signals consecutively coincide with each other. Therefore, no error in the selection of the desired motor control mode takes place, thereby improving the reliability in the construction of the function selecting control system.

As for the present invention, the settlement means outputs a reset-release signal for releasing a reset state of each control function after settling the selection signal so as to release the prohibition of the starting of the control function selected by the selection signal. Therefore, the system never starts before the settlement of the selection signal, thereby improving the safety of the start of the system.

As for the present invention, the settlement means keeps the settled selection signal being impossible to be updated until a shut-off of a power supply in the system after settling the selection signal, thereby preventing the control function from being changed over during the start of the system and improving the fail-safe function.

As for the present invention, the function selecting control system further comprises register means for registering in advance the selection signals which are effective in responding to the system, wherein the selection signal is settled when the input means inputs the registered selection signal for a standard number of times, and a control function corresponding to the selection signal is started, thereby improving the safety of the start of the system.

As for the present invention, the judgment means updates the selection signal when the input signal coincides with the selection signal registered in the register means and compares the updated selection signal with the selection signal to be input next, thereby an early judgment of non-coincidence between the selection signals can be carried out.

As for the present invention, each control logic block comprises comparison means for judging a coincidence between the input selection signal and a mode signal corresponding to the selection signal assigned to the control logic block, wherein the control function is started upon judgment of the coincidence. Therefore, the selection signal does not need to be sent separately for each control logic block, thereby a signal sending system can be simplified.

What is claimed is:

1. A function selecting control system comprising:

a control logic block for storing various control functions of equipment to be controlled after rendering said various control functions logical;

input means for inputting a selection signal which selects a control function corresponding to a control matter from the control logic block;

judgment means for reading the input selection signal for a standard number of times and for judging the coincidence among the read selection signals;

count means for counting the number of times of the coincidence;

settlement means for settling the selection signal when the number of times of the coincidence reaches the predetermined standard number; and system starting means for starting a control function corresponding to the settled selection signal.

2. The function selecting control system according to claim 1, wherein the input means inputs the selection signal in synchronization with a standard clock signal of the system.

3. The function selecting control system according to claim 1 or 2, wherein the settlement means outputs a reset-release signal for releasing a reset state of each control function after settling the selection signal.

4. The function selecting control system according to claim 1 or 2, wherein the settlement means keeps the settled selection signal being impossible to be updated until a shut-off of a power supply in the system after settling the selection signal.

5. The function selecting control system according to claim 1 or 2, further comprising register means for registering in advance the selection signals which are effective in responding to the system, wherein the selection signal is settled when the input means inputs the registered selection signal for a standard number of times.

6. The function selecting control system according to claim 1 or 2, wherein the judgment means updates the selection signal when the input signal coincides with the selection signal registered in the register means and compares the updated selection signal with the selection signal to be input next.

7. The function selecting control system according to claim 1 or 2, wherein each control logic block comprises comparison means for judging a coincidence between the input selection signal and a mode signal corresponding to the selection signal assigned to the control logic block, wherein the control function is started upon judgment of the coincidence.

* * * * *